United States Patent
Suvarna et al.

(10) Patent No.: US 11,157,016 B2
(45) Date of Patent: Oct. 26, 2021

(54) AUTOMATIC RECOGNITION OF MULTIPLE FLOORPLANS BY CLEANING ROBOT

(71) Applicant: NEATO ROBOTICS, INC., Newark, CA (US)

(72) Inventors: Sarath Kumar Suvarna, Fremont, CA (US); Bryant Pong, San Jose, CA (US); Pawel Orzechowski, Los Gatos, CA (US); Joe Tate, San Jose, CA (US); Henry Leinhos, Palo Alto, CA (US)

(73) Assignee: Neato Robotics, Inc., San Jose, CA (US)

( * ) Notice: Subject to any disclaimer, the term of this patent is extended or adjusted under 35 U.S.C. 154(b) by 97 days.

(21) Appl. No.: 16/508,242

(22) Filed: Jul. 10, 2019

(65) Prior Publication Data

US 2020/0019169 A1     Jan. 16, 2020

Related U.S. Application Data

(60) Provisional application No. 62/696,224, filed on Jul. 10, 2018.

(51) Int. Cl.
*G05D 1/02* (2020.01)
*G05D 1/00* (2006.01)

(52) U.S. Cl.
CPC .......... *G05D 1/024* (2013.01); *G05D 1/0088* (2013.01); *G05D 1/0248* (2013.01); *G05D 2201/0203* (2013.01); *G05D 2201/0215* (2013.01)

(58) Field of Classification Search
CPC .......... G05D 1/0088; G05D 1/0248; G05D 2201/0215; G05D 2201/0203; G05D 1/024
See application file for complete search history.

(56) References Cited

U.S. PATENT DOCUMENTS

| | | | |
|---|---|---|---|
| 8,855,914 B1 | 10/2014 | Alexander et al. | |
| 8,903,589 B2 | 12/2014 | Sofman et al. | |
| 8,996,172 B2 | 3/2015 | Shah et al. | |
| 2002/0153184 A1* | 10/2002 | Song | A47L 9/2884 |
| | | | 180/167 |

(Continued)

FOREIGN PATENT DOCUMENTS

| | | | | |
|---|---|---|---|---|
| DE | 102016114594 | * | 2/2018 | ............... G05D 1/02 |
| JP | 20120112200 | * | 1/2012 | ............... A47L 9/28 |
| KR | 20170077756 | * | 7/2017 | ............... A47L 9/28 |

OTHER PUBLICATIONS

Durrant-Whyte et al, "Simultaneous Localisation and Mapping (SLAM): Part I The essential Algorithms", University of Sydney, pp. 3-5. (Year: 2009).*

*Primary Examiner* — Peter D Nolan
*Assistant Examiner* — Kenneth M Dunne
(74) *Attorney, Agent, or Firm* — Kilpatrick Townsend & Stockton LLP

(57) ABSTRACT

In one embodiment, a cleaning robot stores multiple floorplans. The robot automatically determines which floorplan it is in by localizing and trying to match its detected environment to the stored map. The best fit is the map for the current floor. If there is no match above a confidence threshold, the robot assumes it is a new floor or the floorplan has changed (e.g., furniture has moved), and the robot initiates a discovery mode to map the floorplan and add it to the robot's memory.

20 Claims, 9 Drawing Sheets

(56) References Cited

U.S. PATENT DOCUMENTS

| | | | |
|---|---|---|---|
| 2004/0167688 A1* | 8/2004 | Karlsson | G05D 1/024 |
| | | | 701/23 |
| 2016/0150933 A1* | 6/2016 | Duenne | A47L 9/2805 |
| | | | 134/18 |
| 2016/0278599 A1* | 9/2016 | Seo | A47L 11/4066 |
| 2017/0176997 A1* | 6/2017 | Narikawa | G05D 1/0246 |
| 2018/0074508 A1* | 3/2018 | Kleiner | A47L 9/2852 |
| 2019/0196497 A1* | 6/2019 | Eoh | G01C 21/32 |
| 2020/0225673 A1* | 7/2020 | Ebrahimi Afrouzi | |
| | | | G05D 1/0214 |

* cited by examiner

AUTOMATIC RECOGNITION OF MULTIPLE FLOORPLANS BY CLEANING ROBOT

BACKGROUND OF THE INVENTION

This application is a Nonprovisional patent application of Ser. No. 62/696,224 entitled "Automatic Recognition Of Multiple Floorplans By Cleaning Robot," filed Jul. 10, 2018, the disclosure of which is hereby incorporated in its entirety.

The present invention relates to storing and using floorplans in a cleaning robot.

Currently Neato robots allow a user to create and store a persistent map in a cleaning robot. The robot creates the map by starting from a base/charging station, and mapping all the areas it can get to. It uses a LIDAR (Light Detection and Ranging) laser & sensor system and SLAM (Simultaneous Localization and Mapping) algorithm. In this persistent map users can draw virtual boundaries (no-go lines) to restrict the areas that the robot can clean. If a user wishes to create another persistent map (such as by moving the robot to a different floor or house) they will need to delete the existing persistent map and any existing no-go lines.

BRIEF SUMMARY OF THE INVENTION

In one embodiment, a cleaning robot stores multiple floorplans. The robot automatically determines which floorplan it is in by localizing and trying to match its detected environment to the stored map. The best fit is the map for the current floor. If there is no match above a confidence threshold, the robot assumes it is a new floor or the floorplan has changed (e.g., furniture has moved), and the robot initiates a discovery mode to map the floorplan and add it to the robot's memory.

In one embodiment, an accelerometer, tilt sensor, gyroscopic sensor or other device is used to determine that there has been no motion indicating that the cleaning robot has been picked up. The robot can compute angular excursions based on integrated angular rates generated by the gyroscopic or other sensors, or it can detect a relative change in accelerations directly measured by the accelerometer sensors. If the excursions exceed a threshold, it can be assumed that the robot has been picked up and moved. Thus, the cleaning robot is assumed to be on the same floor it was previously on, and a new determination by localizing and matching to the environment is not performed.

In one embodiment, the cleaning robot uses a two-step process to detect its location. First, the robot performs localization to detect its surroundings. Localization may be done using SLAM, VSLAM (Visual SLAM using image sensors) or other localization methods. Second, the robot performs place recognition by trying to match its environment with different possible locations within a floorplan. For each floorplan, it determines the best match of its location to the floorplan. Finally, the robot determines which best match for the different floorplans has the highest confidence level.

In one embodiment, if the cleaning robot can't determine which floorplan is the best location, it will move to a new location and try again. For example, the range of the LIDAR may be only about 6 feet, and with the current location only a single wall and no corners may be detected, making it difficult to distinguish floorplans. In one embodiment, before trying to match to any floorplan, the robot prescreens to determine if it has enough information. For example, if only one wall is detected, it will not be possible to differentiate between floorplans, and the robot moves to another location or requests that the user move the robot (and possibly the base station) to another location.

In one embodiment, once the robot has selected a best match floorplan, it begins a cleaning run. After it moves, a new localization and attempt to match can be triggered. For example, the trigger can be movement for a certain amount of time or a certain distance (such as twice the LIDAR range, or to the next room). Alternately, the trigger could be the detection of a good localization spot (a large number of scan hits). Upon the trigger, it localizes and runs a comparison against the selected floorplan to confirm it is the right floorplan. If there is not a good match, it runs the process of comparing to the other floorplans again, to determine if another floorplan is a better match. If no floorplan has a sufficient confidence rating, it assumes it is a new or changed floorplan, and begins mapping the floorplan to generate a new map.

In one embodiment, users can create and save an arbitrary number of persistent maps on the same robot. Each of these maps will have their own associated user-created no-go lines (virtual boundaries) independent of any other existing maps. With this feature enabled after a user has created their maps and drawn their desired no-go lines, the robot will iterate through each map to determine which floorplan and no-go lines to honor. Once the appropriate floorplan is found, cleaning begins and the respective no-go lines are imported and followed. The user will be appropriately notified via an app in the cases where multiple maps are deemed too similar or no existing maps match.

DETAILED DESCRIPTION OF THE INVENTION

Overall Architecture

Figure 1:
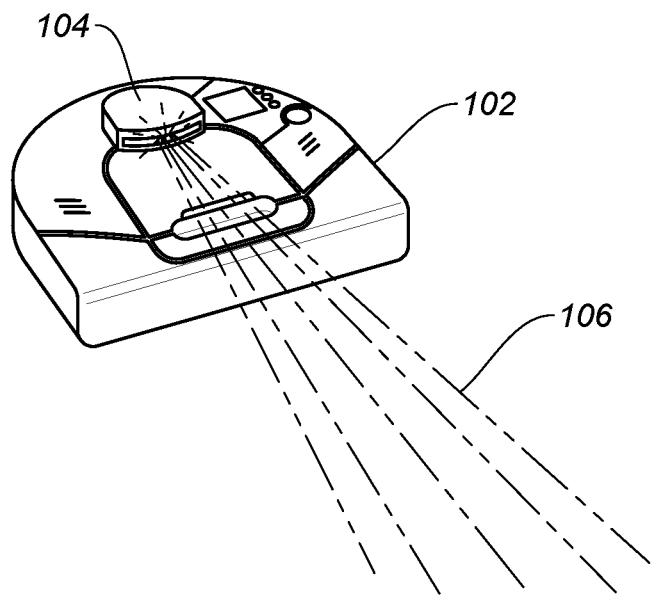
FIG. 1 is a diagram of a cleaning robot with a LIDAR turret according to an embodiment.

FIG. 1 is a diagram of a cleaning robot with a LIDAR turret according to an embodiment. A cleaning robot 102 has a LIDAR (Light Detection and Ranging) turret 104 which emits a rotating laser beam 106. Detected reflections of the laser beam off objects are used to calculate both the distance to objects and the location of the cleaning robot. One embodiment of the distance calculation is set forth in U.S.

Pat. No. 8,996,172, "Distance sensor system and method," the disclosure of which is incorporated herein by reference. Alternately, VSLAM (Visual SLAM using image sensors) or other localization methods can be used. The collected data is also used to create a map, using a SLAM (Simultaneous Localization and Mapping) algorithm. One embodiment of a SLAM algorithm is described in U.S. Pat. No. 8,903,589, "Method and apparatus for simultaneous localization and mapping of mobile robot environment," the disclosure of which is incorporated herein by reference.

Figure 2:
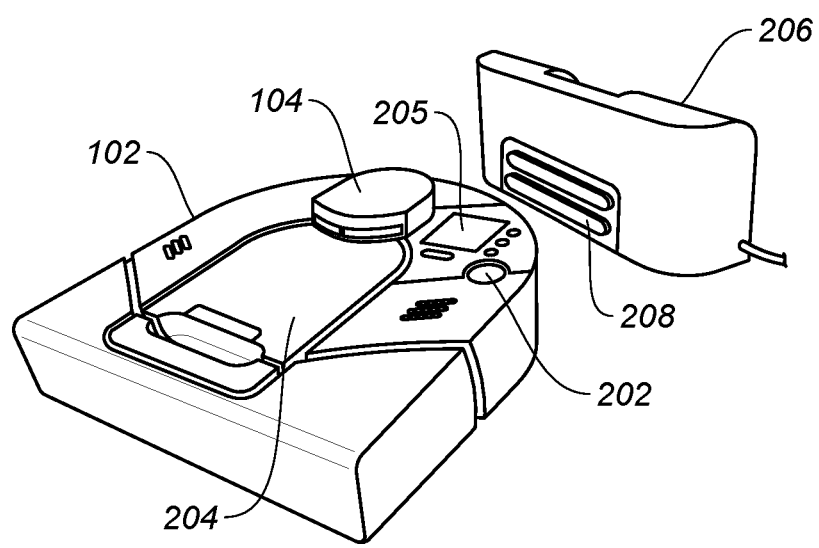
FIG. 2 is a diagram of a cleaning robot and charging station according to an embodiment.

FIG. 2 is a diagram of a cleaning robot and charging station according to an embodiment. Cleaning robot 102 with turret 10 is shown. Also shown is a cover 204 which can be opened to access a dirt collection bag and the top side of a brush. Buttons 202 allow basic operations of the robot cleaner, such as starting a cleaning operation. A display 205 provides information to the user. Cleaning robot 102 can dock with a charging station 206, and receive electricity through charging contacts 208.

Figure 3:
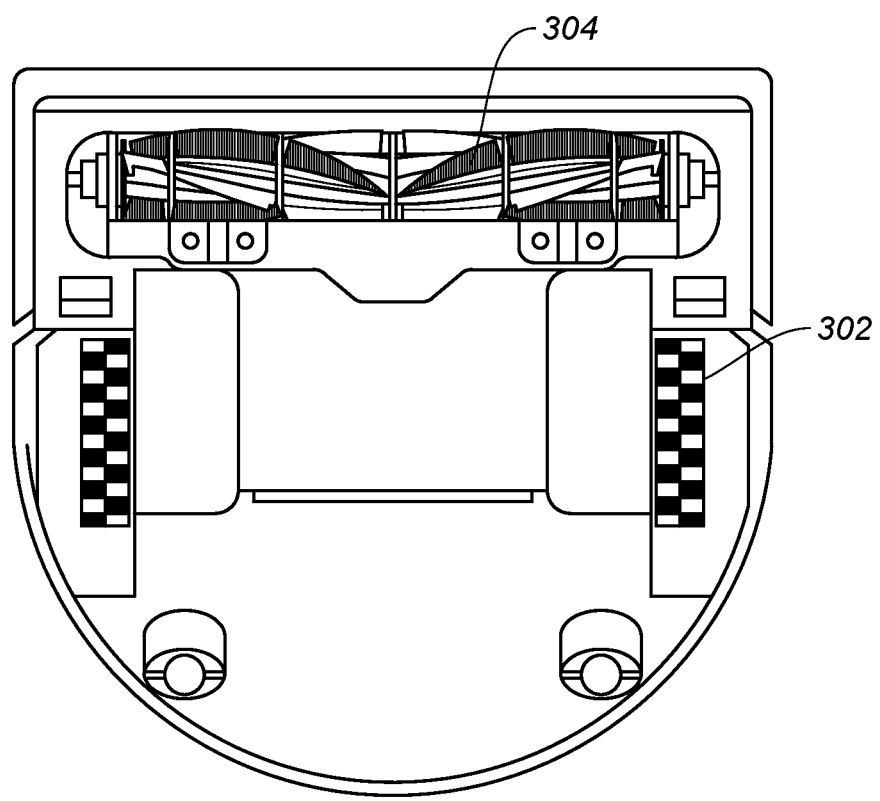
FIG. 3 is a diagram of the underside of a cleaning robot according to an embodiment.

FIG. 3 is a diagram of the underside of a cleaning robot according to an embodiment. Wheels 302 move the cleaning robot, and a brush 304 helps free dirt to be vacuumed into the dirt bag.

Figure 4:
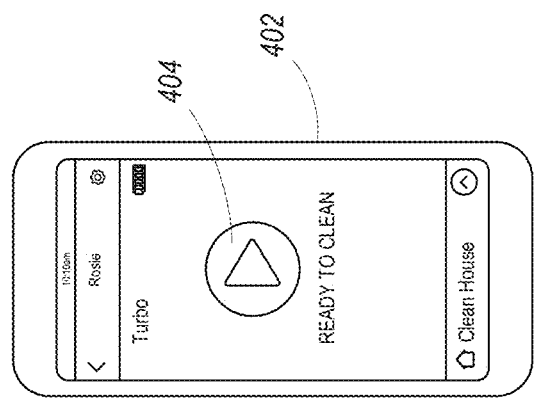
FIG. 4 is a diagram of a smartphone control application display for a cleaning robot according to an embodiment.

FIG. 4 is a diagram of a smartphone control application display for a cleaning robot according to an embodiment. A smartphone 402 has an application that is downloaded to control the cleaning robot. An easy to use interface has a start button 404 to initiate cleaning.

Figure 5:
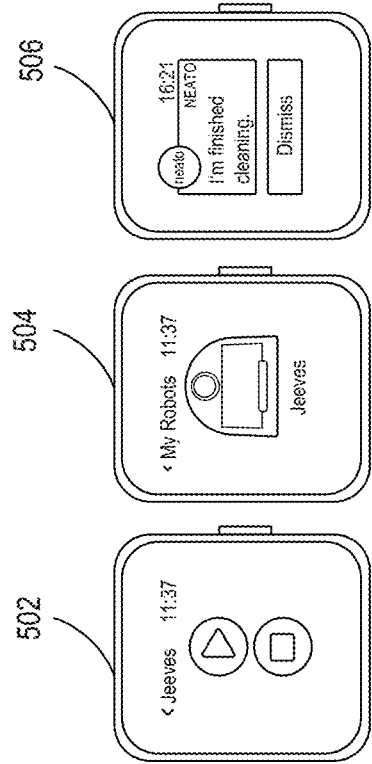
FIG. 5 is a diagram of a smart watch control application display for a cleaning robot according to an embodiment.

FIG. 5 is a diagram of a smart watch control application display for a cleaning robot according to an embodiment. Example displays are shown. A display 502 provides and easy to use start button. A display 504 provides the ability to control multiple cleaning robots. A display 506 provides feedback to the user, such as a message that the cleaning robot has finished.

Figure 6:
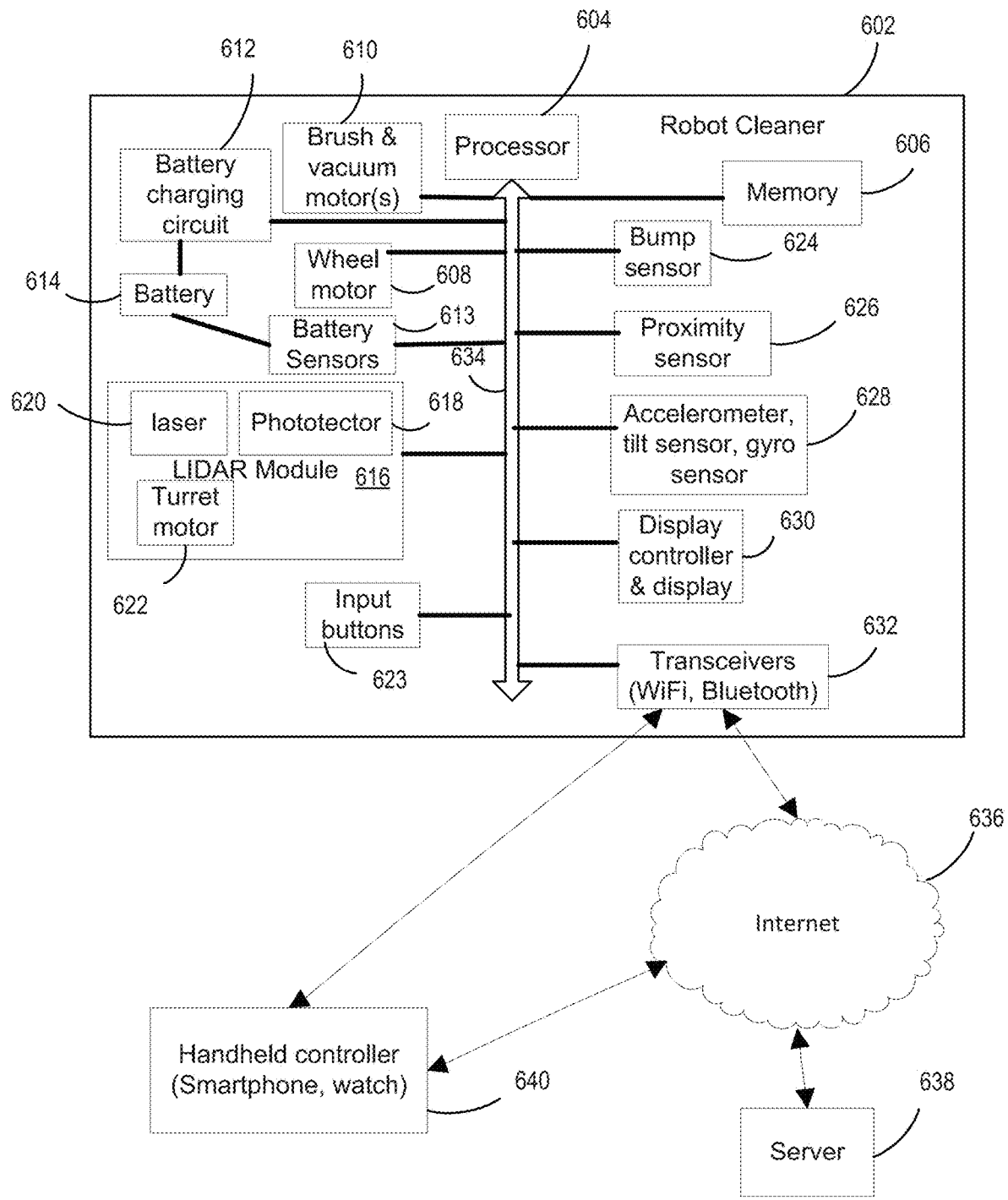
FIG. 6 is a diagram of a the electronic system for a cleaning robot according to an embodiment.

FIG. 6 is a high level diagram of a the electronic system for a cleaning robot according to an embodiment. A cleaning robot 602 includes a processor 604 that operates a program downloaded to memory 606. The processor communicates with other components using a bus 634 or other electrical connections. In a cleaning mode, wheel motors 608 control the wheels independently to move and steer the robot. Brush and vacuum motors 610 clean the floor, and can be operated in different modes, such as a higher power intensive cleaning mode or a normal power mode.

LIDAR module 616 includes a laser 620 and a detector 616. Alternately, an image sensor can be used with a VSLAM operation. A turret motor 622 moves the laser and detector to detect objects up to 360 degrees around the cleaning robot. There are multiple rotations per second, such as about 5 rotations per second. Various sensors provide inputs to processor 604, such as a bump sensor 624 indicating contact with an object, proximity sensor 626 indicating closeness to an object, and accelerometer/tilt/gyroscopic sensors 628, which indicate a drop-off (e.g., stairs) or a tilting of the cleaning robot (e.g., upon climbing over an obstacle). The robot can include either one of, or any combination of, a tilt sensor, accelerometer and gyroscopic sensor, and can contain multiple ones of each type of sensor. Examples of the usage of such sensors for navigation and other controls of the cleaning robot are set forth in U.S. Pat. No. 8,855,914, "Method and apparatus for traversing corners of a floored area with a robotic surface treatment apparatus," the disclosure of which is incorporated herein by reference. Other sensors may be included in other embodiments, such as a dirt sensor for detecting the amount of dirt being vacuumed, a motor current sensor for detecting when the motor is overloaded, such as due to being entangled in something, a floor sensor for detecting the type of floor, and an image sensor (camera) for providing images of the environment and objects.

A battery 614 provides power to the rest of the electronics though power connections (not shown). A battery charging circuit 612 provides charging current to battery 614 when the cleaning robot is docked with charging station 206 of FIG. 2. Battery sensors 613 monitor the battery state, such as charge level, temperature and voltage. The battery sensors 613 can be incorporated in battery charging circuit 612 in one embodiment. Input buttons 623 allow control of robot cleaner 602 directly, in conjunction with a display 630. Alternately, cleaning robot 602 may be controlled remotely, and send data to remote locations, through transceivers 632.

Through the Internet 636, and/or other network(s), the cleaning robot can be controlled, and can send information back to a remote user. A remote server 638 can provide commands, and can process data uploaded from the cleaning robot. A handheld smartphone or watch 640 can be operated by a user to send commands either directly to cleaning robot 602 (through Bluetooth® wireless technology, direct RF, a WiFi LAN, etc.) or can send commands through a connection to the internet 636. The commands could be sent to server 638 for further processing, then forwarded in modified form to cleaning robot 602 over the internet 636.

Computer Systems for Media Platform and Client System

Figure 7:
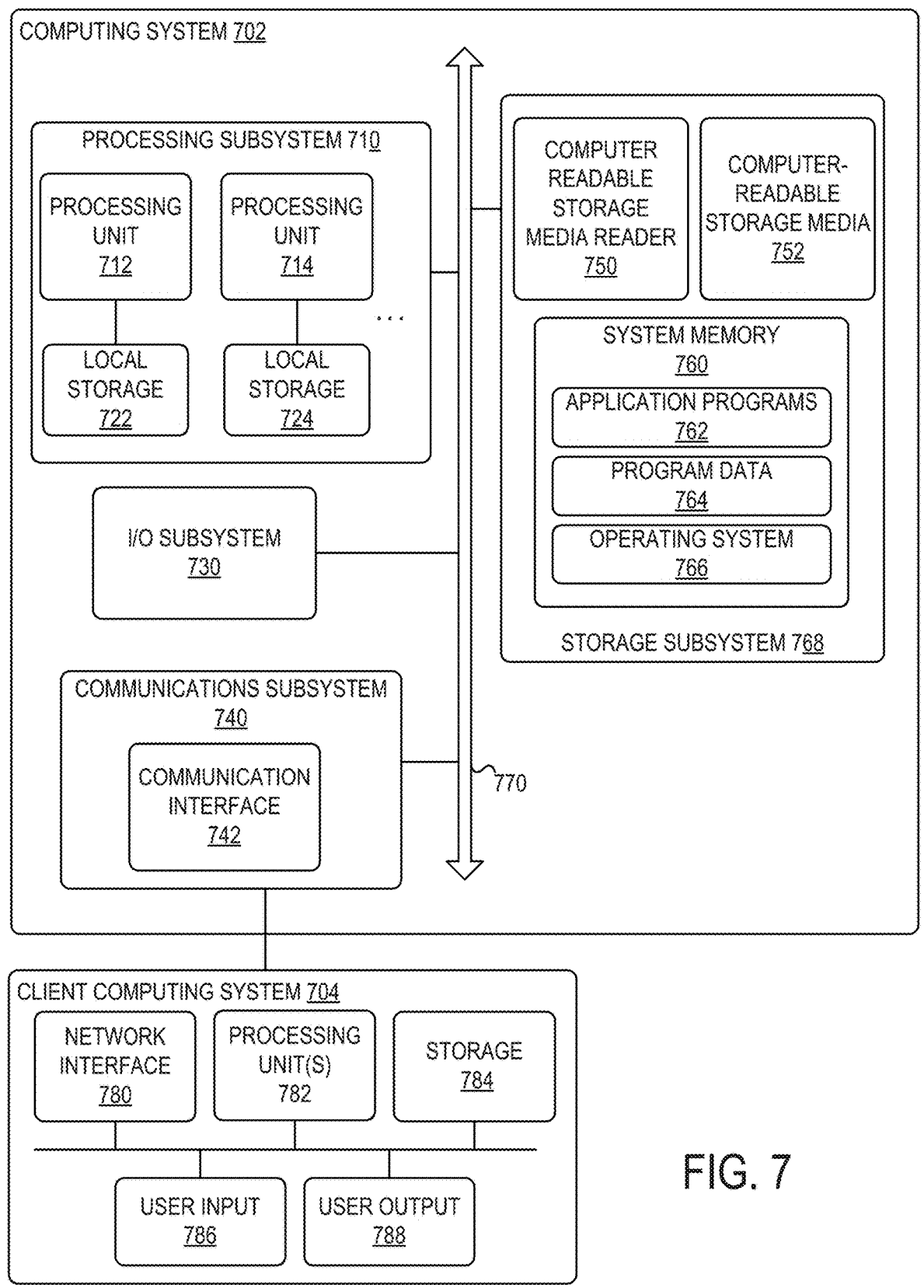
FIG. 7 is a simplified block diagram of a representative computing system and client computing system usable to implement certain embodiments of the present invention.

Various operations described herein may be implemented on computer systems. FIG. 7 shows a simplified block diagram of a representative computing system 702 and client computing system 704 usable to implement certain embodiments of the present invention. In various embodiments, computing system 702 or similar systems may implement the cleaning robot processor system, remote server, or any other computing system described herein or portions thereof. Client computing system 704 or similar systems may implement user devices such as a smartphone or watch with a robot cleaner application.

Computing system 702 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 702 may include processing subsystem 710. Processing subsystem 710 may communicate with a number of peripheral systems via bus subsystem 770. These peripheral systems may include I/O subsystem 730, storage subsystem 768, and communications subsystem 740.

Bus subsystem 770 provides a mechanism for letting the various components and subsystems of server computing system 704 communicate with each other as intended. Although bus subsystem 770 is shown schematically as a single bus, alternative embodiments of the bus subsystem may utilize multiple buses. Bus subsystem 770 may form a local area network that supports communication in processing subsystem 710 and other components of server computing system 702. Bus subsystem 770 may be implemented using various technologies including server racks, hubs, routers, etc. Bus subsystem 770 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 730 may include devices and mechanisms for inputting information to computing system 702 and/or for outputting information from or via computing system 702. In general, use of the term "input device" is intended to include all possible types of devices and mechanisms for inputting information to computing system 702. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 702 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 710 controls the operation of computing system 702 and may comprise one or more processing units 712, 714, etc. A processing unit may include one or more processors, including single core processor or multicore processors, one or more cores of processors, or combinations thereof. In some embodiments, processing subsystem 710 may include one or more special purpose co-processors such as graphics processors, digital signal processors (DSPs), or the like. In some embodiments, some or all of the processing units of processing subsystem 710 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 722, 724. Any type of processors in any combination may be included in processing unit(s) 712, 714.

In some embodiments, processing subsystem 710 may be implemented in a modular design that incorporates any number of modules (e.g., blades in a blade server implementation). Each module may include processing unit(s) and local storage. For example, processing subsystem 710 may include processing unit 712 and corresponding local storage 722, and processing unit 714 and corresponding local storage 724.

Local storage 722, 724 may include volatile storage media (e.g., conventional DRAM, SRAM, SDRAM, or the like) and/or non-volatile storage media (e.g., magnetic or optical disk, flash memory, or the like). Storage media incorporated in local storage 722, 724 may be fixed, removable or upgradeable as desired. Local storage 722, 724 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 712, 714 need at runtime. The ROM may store static data and instructions that are needed by processing unit(s) 712, 714. The permanent storage device may be a non-volatile read-and-write memory device that may store instructions and data even when a module including one or more processing units 712, 714 and local storage 722, 724 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 722, 724 may store one or more software programs to be executed by processing unit(s) 712, 714, such as an operating system and/or programs implementing various server functions such as functions of UPP system 102, or any other server(s) associated with UPP system 102. "Software" refers generally to sequences of instructions that, when executed by processing unit(s) 712, 714 cause computing system 702 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 712, 714. In some embodiments the instructions may be stored by storage subsystem 768 (e.g., computer readable storage media). In various embodiments, the processing units may execute a variety of programs or code instructions and may maintain multiple concurrently executing programs or processes. At any given time, some or all of the program code to be executed may be resident in local storage 722, 724 and/or in storage subsystem including potentially on one or more storage devices. Software may be implemented as a single program or a collection of separate programs or program modules that interact as desired. From local storage 722, 724 (or non-local storage described below), processing unit(s) 712, 714 may retrieve program instructions to execute and data to process in order to execute various operations described above.

Storage subsystem 768 provides a repository or data store for storing information that is used by computing system 702. Storage subsystem 768 provides a tangible non-transitory computer-readable storage medium for storing the basic programming and data constructs that provide the functionality of some embodiments. Software (programs, code modules, instructions) that when executed by processing subsystem 710 provide the functionality described above may be stored in storage subsystem 768. The software may be executed by one or more processing units of processing subsystem 710. Storage subsystem 768 may also provide a repository for storing data used in accordance with the present invention.

Storage subsystem 768 may include one or more non-transitory memory devices, including volatile and non-volatile memory devices. As shown in FIG. 7, storage subsystem 768 includes a system memory 760 and a computer-readable storage media 752. System memory 760 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 702, such as during start-up, may typically be stored in the ROM. The RAM typically contains data and/or program modules that are presently being operated and executed by processing subsystem 710. In some implementations, system memory 760 may include multiple different types of memory, such as static random access memory (SRAM) or dynamic random access memory (DRAM). Storage subsystem 768 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 768.

By way of example, and not limitation, as depicted in FIG. 7, system memory 760 may store application programs 762, which may include client applications, Web browsers, mid-tier applications, relational database management systems (RDBMS), etc., program data 764, and one or more operating systems 766. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 752 may store programming and data constructs that provide the functionality of some embodiments. Software (programs, code modules, instructions) that when executed by processing subsystem 710 a processor provide the functionality described above may be stored in storage subsystem 768. By way of example, computer-readable storage media 752 may include non-volatile memory such as a hard disk drive, a magnetic disk drive, an optical disk drive such as a CD ROM, DVD, a Blu-Ray® disk, or other optical media. Computer-readable storage media 752 may include, but is not limited to, Zip® drives, flash memory cards, universal serial bus (USB) flash drives, secure digital (SD) cards, DVD disks, digital video tape, and the like. Computer-readable storage media 752 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 752 may provide storage of computer-readable instructions, data structures, program modules, and other data for computing system 702.

In certain embodiments, storage subsystem 768 may also include a computer-readable storage media reader 750 that may further be connected to computer-readable storage media 752. Together and, optionally, in combination with system memory 760, computer-readable storage media 752 may comprehensively represent remote, local, fixed, and/or removable storage devices plus storage media for storing computer-readable information.

In certain embodiments, computing system 702 may provide support for executing one or more virtual machines. Computing system 702 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 702. Accordingly, multiple operating systems may potentially be run concurrently by computing system 702. Each virtual machine generally runs independently of the other virtual machines.

Communication subsystem 740 provides an interface to other computer systems and networks. Communication subsystem 740 serves as an interface for receiving data from and transmitting data to other systems from computing system 702. For example, communication subsystem 740 may enable computing system 702 to establish a communication channel to one or more client computing devices via the Internet for receiving and sending information from and to the client computing devices.

Communication subsystem 740 may support both wired and/or wireless communication protocols. For example, in certain embodiments, communication subsystem 740 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 740 may provide wired network connectivity (e.g., Ethernet) in addition to or instead of a wireless interface.

Communication subsystem 740 may receive and transmit data in various forms. For example, in some embodiments, communication subsystem 740 may receive input communication in the form of structured and/or unstructured data feeds, event streams, event updates, and the like. For example, communication subsystem 740 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 740 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 740 may also be configured to output the structured and/or unstructured data feeds, event streams, event updates, and the like to one or more databases that may be in communication with one or more streaming data source computers coupled to computing system 702.

Communication subsystem 740 may provide a communication interface 742, e.g., a WAN interface, which may provide data communication capability between the local area network (bus subsystem 770) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 702 may operate in response to requests received via communication interface 742. Further, in some embodiments, communication interface 742 may connect computing systems 702 to each other, providing scalable systems capable of managing high volumes of activity. Conventional or other techniques for managing server systems and server farms (collections of server systems that cooperate) may be used, including dynamic resource allocation and reallocation.

Computing system 702 may interact with various user-owned or user-operated devices via a wide-area network such as the Internet. An example of a user-operated device is shown in FIG. 7 as client computing system 702. Client computing system 704 may be implemented, for example, as a consumer device such as a smart phone, other mobile phone, tablet computer, wearable computing device (e.g., smart watch, eyeglasses), desktop computer, laptop computer, and so on.

For example, client computing system 704 may communicate with computing system 702 via communication interface 742. Client computing system 704 may include conventional computer components such as processing unit(s) 782, storage device 784, network interface 780, user input device 786, and user output device 788. Client computing system 704 may be a computing device implemented in a variety of form factors, such as a desktop computer, laptop computer, tablet computer, smart phone, other mobile computing device, wearable computing device, or the like.

Processing unit(s) 782 and storage device 784 may be similar to processing unit(s) 712, 714 and local storage 722, 724 described above. Suitable devices may be selected based on the demands to be placed on client computing system 704; for example, client computing system 704 may be implemented as a "thin" client with limited processing capability or as a high-powered computing device. Client computing system 704 may be provisioned with program code executable by processing unit(s) 782 to enable various interactions with computing system 702 of a message management service such as accessing messages, performing actions on messages, and other interactions described above.

Some client computing systems 704 may also interact with a messaging service independently of the message management service.

Network interface 780 may provide a connection to a wide area network (e.g., the Internet) to which communication interface 740 of computing system 702 is also connected. In various embodiments, network interface 780 may include a wired interface (e.g., Ethernet) and/or a wireless interface implementing various RF data communication standards such as Wi-Fi, Bluetooth® wireless technology, or cellular data network standards (e.g., 3G, 4G, LTE, etc.).

User input device 786 may include any device (or devices) via which a user may provide signals to client computing system 704; client computing system 704 may interpret the signals as indicative of particular user requests or information. In various embodiments, user input device 786 may include any or all of a keyboard, touch pad, touch screen, mouse or other pointing device, scroll wheel, click wheel, dial, button, switch, keypad, microphone, and so on.

User output device 788 may include any device via which client computing system 704 may provide information to a user. For example, user output device 788 may include a display to display images generated by or delivered to client computing system 704. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 788 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 712, 714 and 782 may provide various functionality for computing system 702 and client computing system 704, including any of the functionality described herein as being performed by a server or client, or other functionality associated with message management services.

It will be appreciated that computing system 702 and client computing system 704 are illustrative and that variations and modifications are possible. Computer systems used in connection with embodiments of the present invention may have other capabilities not specifically described here. Further, while computing system 702 and client computing system 704 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

Multiple Floorplans

Embodiments of the present invention allow users who have multiple floors in their home to create at least one map per floor. This avoids having the user continuously generate and delete maps to clean different floors. Another use case is if the user wishes to have different sets of no-go lines for the same environment (same floorplan). For example, the user can create one floorplan that excludes certain rooms or areas and another floorplan that contains the excluded rooms or areas. This increases the cleaning flexibility of the robots. For example, a first floorplan may include high traffic and high dirt accumulation areas, and avoid areas that take a lot of time to clean. This can allow the user to clean in a short time before guests come over, etc.

Figure 8:
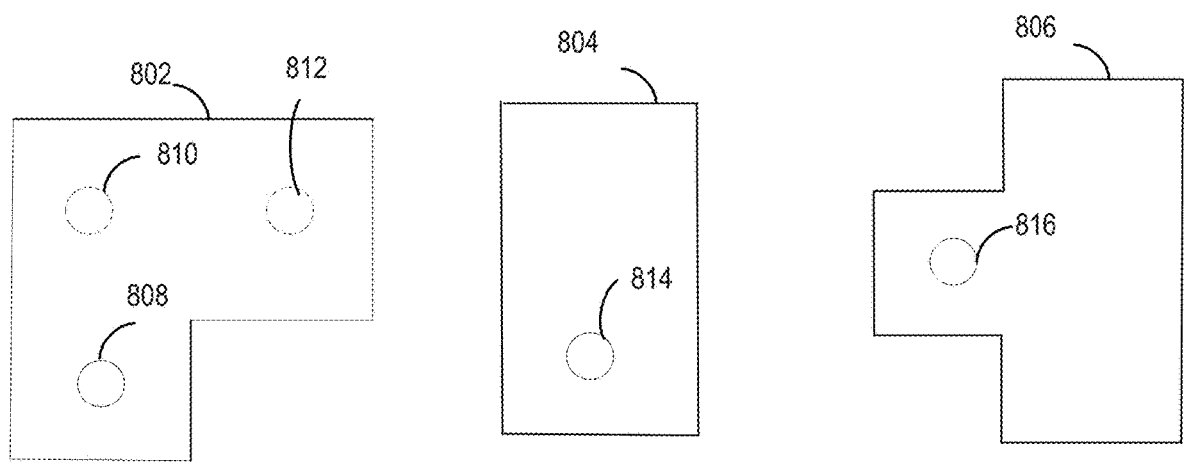
FIG. 8 is a diagram of multiple floorplans according to an embodiment.

FIG. 8 illustrates multiple floorplans stored by a cleaning robot in one embodiment. Floorplans 802, 804 and 806 are shown. If the robot has mapped a floorplan, and returned to base, it knows where it is and does not need to try to figure out which floorplan it is in. However, if the base is moved, or if the user picks up the robot and places it in another location, the robot can figure out where it is. FIG. 8 shows multiple possible locations where the robot could be—locations 808, 810, 812 on floorplan 802; location 814 on floorplan 804, or location 816 on floorplan 806, for example. It could also be anywhere else on any of these floorplans, or a different floorplan.

In one embodiment, an accelerometer, tilt sensor, or other device is used to determine that there has been no motion indicating that the cleaning robot has been picked up. The sensors used can be accelerometer and tilt sensors 628 shown in FIG. 6. If a user picks up the cleaning robot to carry it to another floor, such as by climbing stairs, the robot will almost always be tilted by more than 3-10 degrees or have an acceleration that exceeds 0.5-2 g (g-force or gravitational force). An algorithm for robot displacement is not limited to angular excursions detection, but can alternately use a relative change in accelerations directly measured by the accelerometer sensors. Alternately, both angular excursions and change in acceleration can be used, with either both required to assume movement of the robot, or one of the two sensors can be sufficient to assume movement of the robot to another floor. In one embodiment, if either the angular excursion exceeds 5 deg. (measured by either an accelerometer(s) or gyro(s) in tilt or accelerations exceed 0.1 g in either axis, the algorithm for localization and environment matching is performed. Alternately, a sensor can simply detect that the elevation of the cleaning robot has changed, even if the user was holding it level when it was picked up. In one embodiment, a combination of sensors can be used to detect the absence of both tilt and elevation change before assuming the cleaning robot is on the same floorplan. Thus, the cleaning robot is assumed to be on the same floor it was previously on, and a new determination by localizing and matching to the environment is not performed.

Figure 9:
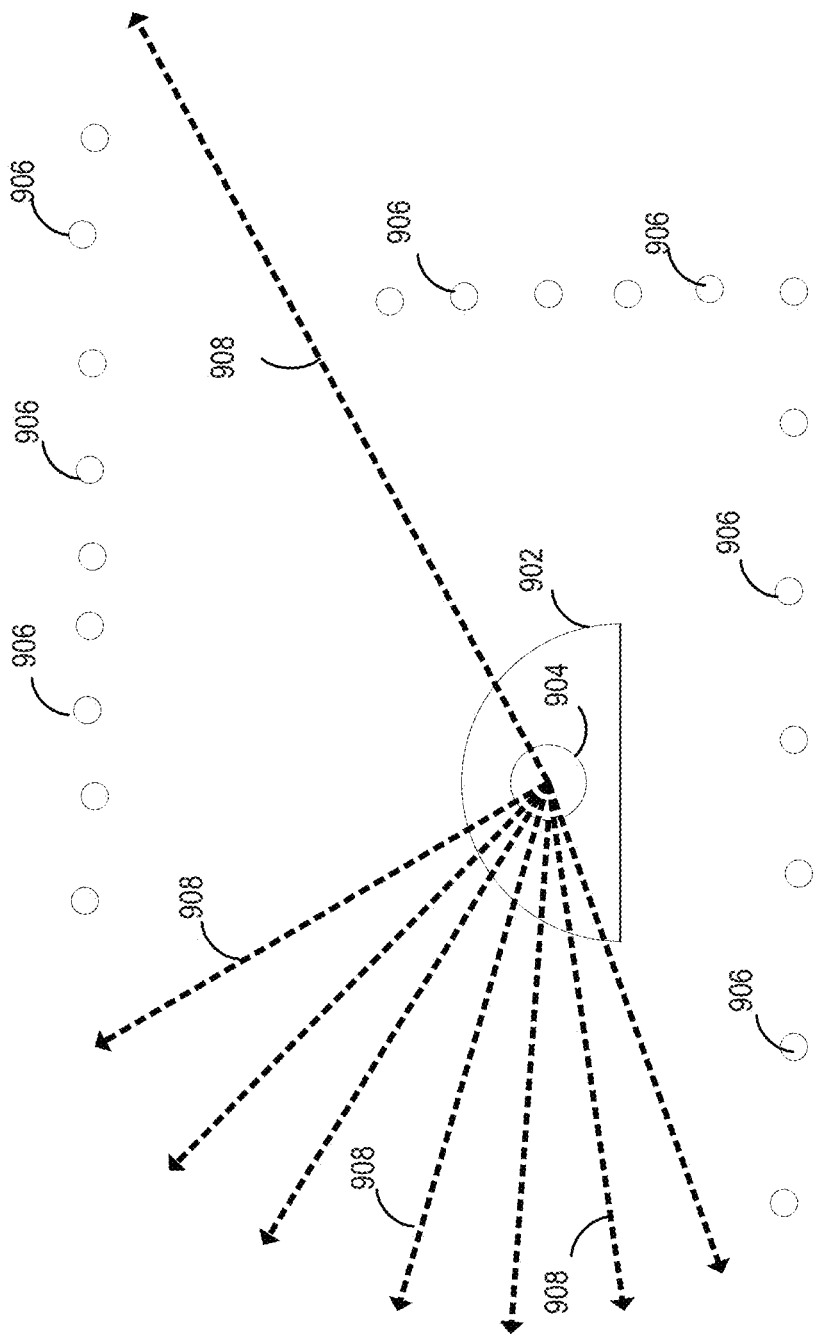
FIG. 9 is a diagram illustrating localization by a robot according to an embodiment.

FIG. 9 illustrates a robot 902 scanning its environment in one embodiment. A laser beam on a rotating turret 904 scans in 360 degrees for reflections, and notes the distance of each reflection. Dots 906 indicate where there is a reflection, due to hitting a wall or other object. Dotted lines 908 indicate where there is no reflection, indicating no wall or other object within the range of the LIDAR detector. For example, the range may be around 6 feet, and anything beyond that may not be detected. In one embodiment, 360 points are obtained. Alternately, a smaller number may be used, such as 180, 90, 72 or 36. In another example, a larger number of points can be used, and each angle does not need to have an integer number of points for it. E.g., 720 or 1000 points could be used or a number only limited by how fast the data can be collected, depending on, for example, the particular rotary transformer used and the memory write speed of the chip in the Laser Distance Sensor (LDS). Additionally, multiple scans can be used to create the pattern of dots, and to make the dataset more accurate.

The robot thus has a pattern of dots which it will try to match to the floorplans of FIG. 8. First, for floorplan 802, it will try the various locations such as 808, 810, 812 to see if there is a match and the amount of the match. For example, a ratio of a sum of the hits (dots) over the sum of the possible hits (dot locations that should be hit on a map) can be calculated. The higher the ratio, the better the confidence level. In one embodiment, it assumes it is near the charging station first, then tries a variety of other locations. The order and number of locations tried can vary. It can try in the middle of the floorplan, or the middle of each room next, trying to match recorded points in the floorplan. If there is a close match, it can try other locations very close by. If there is a poor match, it can try more distant locations.

In one embodiment, a prescreen is done. If the dots located only provide minimal information, such as a single line (indicating a single wall), the robot won't even try to match to a stored map. A single line is assumed to be insufficient to distinguish locations. The robot would then move or ask to be moved without trying to do a match.

In one embodiment, if two floorplans are too similar (e.g., within 5-10% of a match), the robot can prompt the user to move the robot base station to a more distinctive location. The robot could analyze the floorplans, detect possible better locations, and prompt the user to try one of several locations highlighted on a map.

The robot repeats the process for each of floorplans 804 and 806. It will identify a best match for each floorplan, such as 808, 814 and 816. Then, it will compare to see which match of the multiple floorplans has the highest confidence. If the confidence score is above a certain threshold (e.g., 80-90% of the points match), it will conclude it is on that floorplan. If the confidence threshold is not met, it will assume it is on a new or changed floorplan, and begin a discovery run to map the floorplan. The floorplan can be changed because the user moved or added furniture, for example. The new floorplan will then be added to the robot's memory. In one embodiment, there is a limit to the number of floorplans stored, and the user may be prompted to delete one of the floorplans to make room for the new one. Alternately, the oldest created floorplan could be deleted. In another example, the robot could compare the new floorplan to existing floorplans, and determine if the walls are the same (the perimeter), and there are only changes in the middle (indicating new/moved furniture). The closest match floorplan could then be deleted.

In one embodiment, if the cleaning robot can't determine which floorplan location is the best match, it will move to a new location and try again. For example, the range of the LIDAR may be only about 6 feet, and with the current location only a single wall and no corners may be detected, making it difficult to distinguish floorplans or portions of the same floorplan. In one embodiment, before trying to match to any floorplan, the robot determines if it has enough information. For example, if only one wall is detected, it will not be possible to differentiate between floorplans, and the robot moves to another location or requests that the user move the robot (and the base station) to another floorplan. If there are no virtual boundaries (no-go lines) on any of the floorplans, the robot can simply move to a new location. If there is at least one virtual boundary on at least one floorplan, the robot will not move itself because it doesn't know where it is and it may cross the boundary. Accordingly, a message is sent to the user prompting the user to move the robot to a new location.

In one embodiment, once the robot has selected a best match floorplan, it begins a cleaning run. After it moves, a new localization and attempt to match can be triggered. For example, the trigger can be movement for a certain amount of time or a certain distance (such as twice the LIDAR range, or to the next room). Alternately, the trigger could be the detection of a good localization spot (a large number of scan hits). Upon the trigger, it localizes and runs a comparison against the selected floorplan to confirm it is the right floorplan. If there is not a good match, it runs the process of comparing to the other floorplans again, to determine if another floorplan is a better match. If no floorplan has a sufficient confidence rating, it assumes it is a new or changed floorplan, and begins mapping the floorplan to generate a new map. In one embodiment, the second localization and comparison is only done if the confidence level of the original floorplan was good, but not great, or if the difference in confidence levels between floorplans was not high, making it a close call. For example, a confidence level above 95% with a difference between floorplans of over 10-20% may not trigger a second evaluation.

In one embodiment, a large floorplan make take a long time for localization. Thus, it may be split up into partial floorplans, with the localization and comparison being done for each of the partial maps/floorplans.

In one embodiment, multiple floorplans may be used for the same level of a house, but where there is some dividing line, such as a step or two down in a split level. A ramp could be provided for the robot to transition between floors, or in the absence of a ramp, the robot can ask the user to move it when it has finished with one floorplan. In one embodiment, a 3D map of a house may be provided, which may be as simple as relating several floorplans by tagging which is above the other. In one embodiment, a pressure sensor on the cleaning robot can detect which level it is on by the difference in ambient pressure with altitude. Alternately, the difference in pressure can be used as an additional confirmation that the robot has detected the right floorplan.

In one embodiment, once a best match floorplan or map is determined, the robot uses that floorplan for cleaning the environment. The use of the map may include avoiding passing through virtual boundaries marked on the map as discussed below. Also, the map can be displayed to the user, with the current location of the cleaning robot. Another use of the map is to estimate the amount of area left to clean, and thus the amount of charge needed. The map can also be used to plan an optimum cleaning route, such as handling hardwood floors first, since they can be cleaned more quickly and can thus demonstrate faster progress to the user. That progress can be indicated by graying or coloring areas on a map display that have already been cleaned.

Virtual Boundaries (No-go Lines)

In one embodiment, users can create and save an arbitrary number of persistent maps on the same robot. Each of these maps can have their own associated user-created no-go lines (virtual boundaries) independent of any other existing maps. The user can be provided with an image of the floorplan on a display of a computer, smartphone, tablet or other device. The user can trace with a finger, or otherwise indicate, a virtual boundary not to be crossed by the robot. Alternately, the robot can suggest boundaries for the user to accept or reject. For example, the robot can detect obstacles that might entangle it, such as electric cords, or a drop off at a step, etc.

Figure 10:
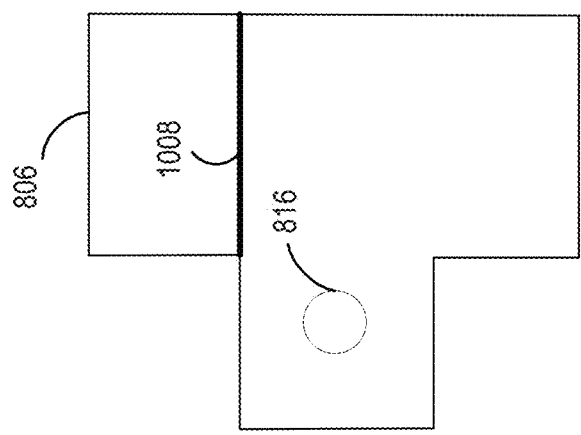
FIG. 10 is a diagram illustrating floorplans with virtual boundaries by a robot according to an embodiment.
Figure 10:
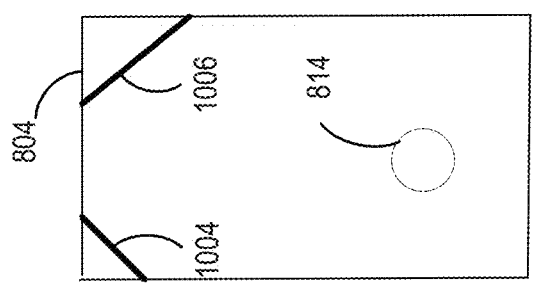
Figure 10:
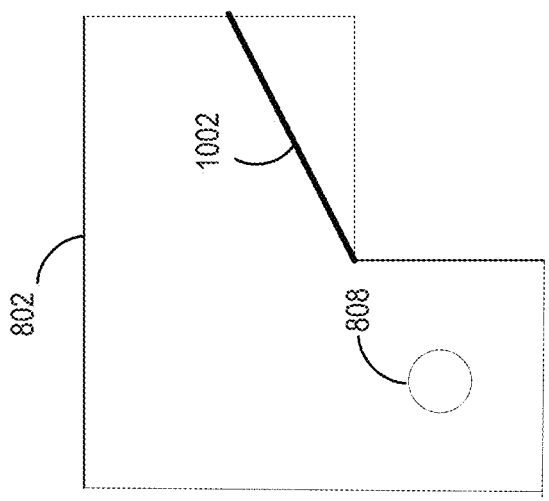

FIG. 10 illustrates virtual boundaries on floorplans 802, 804 and 806. Floorplan 802 has a virtual boundary 1002 associated with it. Floorplan 804 has virtual boundaries 1004 and 1006. Floorplan 806 has virtual boundary 1008. The virtual boundaries may be stored in memory as a set of two endpoints in x, y space. Alternately, a virtual boundary can have one or more angles, with additional endpoints, or could be represented as a series of dual endpoints. In another embodiment, a curved virtual boundary may be indicated with a series of points.

In one embodiment, the virtual boundaries are indicated in the same data as the map. Alternatively, a set of virtual boundaries can be separately stored, and linked to a particular map/floorplan with a tag. Multiple sets of virtual boundaries can be linked to the same map in this manner.

After a user has created various maps/floorplans and drawn desired virtual boundaries (no-go lines), the robot will iterate through each map to determine which floorplan it is on, as described above. It will then honor the no-go lines associated with that floorplan. Once the appropriate floorplan is found, cleaning begins and the respective no-go lines are imported and followed. The user will be appropriate notified via the app in the cases where multiple maps are deemed too similar or no existing maps match.

In one embodiment, the user can create multiple floorplans with different virtual boundaries. For example, one floorplan may have no boundaries, or boundaries around steps and wires only. A second floorplan may have boundaries to limit the robot to cleaning only high traffic areas, so that the cleaning time is quicker. The robot can automatically determine which floorplan it is on, but the user will need to indicate which set of virtual boundaries to use. The robot could use a default set of boundaries, such as using the first set of virtual boundaries created by the user. Alternately, the robot can prompt the user to select between multiple floorplans with the same layout but different virtual boundaries. Absent user selection within a timeout period, the robot can use the default selection. Alternatively, the robot default could combine all the virtual boundaries from all the floorplans for the same layout, to insure the most conservative approach until the user indicates otherwise. The user might provide the input after the robot is well into the cleaning run, and regardless of the floorplan selected, no virtual boundary will have been crossed.

In one embodiment, the floorplans and virtual boundaries are stored in the memory of the robot. Some basic information can be shared with a remote server over the Internet. That information can include the names of the floorplans, and enough data to allow drawing a map on the display of the user's computing device. That data can include the points identifying the virtual boundaries. Alternately, the entire map can be stored in the remote server or a local computer.

User Interface

Figures 11, 12:
FIGS. 11-12 are diagrams illustrating GUIs for floorplan options according to embodiments.

FIGS. 11-12 are diagrams illustrating GUIs for floorplan options according to embodiments. FIG. 11 shows a smartphone 1102 with a display 1104 and running a cleaning robot application that has been downloaded from the Internet. If a floorplan is not recognized, a notification 1106 is provided to the user, with a request 1108 to move the robot and/or charging base station to a new location.

FIG. 12 illustrates an embodiment with an application running on a smartwatch 1202 with a display 1206. The entire cleaning robot application may be on the smart watch, or may be on a smartphone, tablet or other computer in communication with the smartwatch, but providing some or all display images for the smartwatch. Upon executing a discovery run and creating a new floorplan, the robot can prompt the user with a prompt 1206 to name the new floorplan.

Multiple Robots.

In one embodiment, multiple cleaning robots are used and can share information. In one example, multiple robots can be on the same floorplan, with a master robot doing the discovery run and generating the floorplan, then providing the floorplan or portions of the floorplan to different slave robots to clean assigned areas. Alternately, multiple robots could do discovery runs, with each mapping a portion of the floorplan, which is then combined or stitched together by sharing of the various floorplan portions.

In one embodiment, multiple cleaning robots are used with one in each of a multiple of floorplans. The robots can share information, so that they can be moved to a different floorplan, or multiple robots could be placed on the same floorplan, such as for faster cleaning for a particular occasion. When multiple robots are placed on the same floorplan, they can each do a determination of which floorplan they are on, and compare results to see if they agree. This allows multiple locations on the same floorplan to be compared simultaneously.

In one embodiment, multiple cleaning robots of different types are used. For example, one robot may be smaller to get into tighter places, but may not have the vacuum power of another robot. Alternately, robots may be customized for different tasks. One robot may have a brush and vacuum for carpet, while another may have a soap and water dispenser and scrubbing pad for tile or wood floors.

Image Sensor

In one embodiment, VSLAM is used with a camera or other image sensor. The location in the room and the particular floorplan is identified by matching captured images to images stored in the robot, in a local computer connected wirelessly via a LAN, or in a remote server. In one embodiment, upon the first discovery run, a distinctive image is located near the charging base for each floor plan, and the direction of that image is recorded. For example, the robot can detect an area with a high amount of color variation. That might be a painting on a wall, a lamp, a piece of furniture, a drape, etc. Upon a next run, after being moved to a different charging station, or moved with the charging station, and needing to re-orient, the robot can first look in the recorded direction for each floor plan, and compare to the image for each floor plan, to determine if a match is found. If no match is found, the complete orientation step can be done. As in the above example for using LIDAR and SLAM, the robot can try a first location, and can move or ask the user to move it if there is not enough information or no clear match.

In an embodiment using LIDAR, the robot may also have a camera. The camera can be used first to try to identify a distinctive image which indicates which floorplan the robot is in. If that is unsuccessful, the localization and matching as described above can be done. In one embodiment, the user can place a distinctive sticker or other object where the robot can find it. For example, a barcode or QR codes could be placed on a wall or other object, or even the charger, and matched to the floorplan. The application program on the user's smart phone could prompt the user to scan the code and link it to the appropriate floor plan. Alternately, the robot could detect the bar or QR code or other object, and link it to the floorplan it has recognized by other means.

In one embodiment, once the robot has selected a best match floorplan, it begins a cleaning run. After it moves a certain distance (such as to another room), it localizes and runs a comparison against the selected floorplan to confirm it is the right floorplan. For example, it may try a particular direction with a unique image in the second room that was previously located and stored in a discovery run. If there is not a good match, it runs the process of comparing to the other floorplans again, to determine if another floorplan is a better match. If no floorplan has a sufficient confidence rating, it assumes it is a new or changed floorplan, and begins mapping the floorplan to generate a new map. In one embodiment, as in the above LIDAR example, the second localization and comparison is only done if the confidence level of the original floorplan was good, but not great, or if the difference in confidence levels between floorplans was not high, making it a close call. For example, a confidence level above 90% with a difference between floorplans of over 30% may not trigger a second evaluation.

Other Embodiments.

While the invention has been described with respect to specific embodiments, one skilled in the art will recognize that numerous modifications are possible. Embodiments of the invention may be realized using a variety of computer systems and communication technologies including but not limited to specific examples described herein. For example, embodiments of the invention can be applied to not just cleaning robots, but other robots, such as lawn mowing robots (certain areas may need mowing more often, or flowers may need to be avoided with a virtual boundary). Virtual boundaries can indicate what areas don't need to be monitored by a security robot, or don't need to be checked as often. Robots for measuring temperature, air quality, or other functions may similarly use virtual boundaries.

Embodiments of the present invention may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for operating a cleaning robot comprising:
    (a) using a location sensor to create multiple floorplan maps of multiple environments;
    (b) storing the multiple floorplan maps in a memory;
    (c) detecting features of an environment around the cleaning robot;
    (d) matching the features to each of the multiple floorplan maps to determine a best match to identify which environment the cleaning robot is in by
        first, localizing within each floorplan map by testing for a match for different locations within each floorplan map;
        second, identifying a best match within each floorplan map; and
        third, comparing the best match for each floorplan map to determine a best match floorplan map;
    (e) determining a confidence level for the best match floorplan map;
    (f) determining if the confidence level exceeds a confidence threshold; and
    (g) if the confidence level exceeds the confidence threshold, initiating cleaning of the environment using the best match floorplan map.

2. The method of claim 1 further comprising:
    if the confidence level does not exceed the confidence threshold, initiating a discovery mode to map the environment and add it as a new floorplan to the memory.

3. The method of claim 1 wherein the localizing is performed using a SLAM method with data from one of an LDS sensor or an image sensor.

4. The method of claim 1 further comprising:
    moving the cleaning robot;
    after the cleaning robot moves to a new location during the cleaning, repeating steps (c)-(g) to verify that the cleaning robot has identified a correct floorplan map.

5. The method of claim 4 wherein repeating steps (c)-(g) is performed if the cleaning robot is unable to determine a best match because a plurality of the multiple floorplan maps match within a threshold.

6. The method of claim 4
    wherein the new location is one of a new room or beyond a detection range of the sensor from a location of the cleaning robot during step (c).

7. The method of claim 1 further comprising:
    determining, with a movement sensor, that the cleaning robot has not been picked up; and
    using a last floorplan map if the cleaning robot has not been picked up.

8. The method of claim 7 wherein the movement sensor is one of an accelerometer, gyroscopic sensor and a tilt sensor.

9. The method of claim 7 wherein determining, with a movement sensor, that the cleaning robot has not been picked up comprises determining that there has been no tilt of more than a tilt threshold between 3-10 degrees or an acceleration that exceeds an acceleration threshold between 0.5-2.0 g-force.

10. A cleaning robot, comprising:
    a cleaning robot housing of the cleaning robot;
    a motor mounted in the housing for moving the cleaning robot;
    a battery connected to provide electrical power to the motor;
    a location sensor mounted in the cleaning robot for detecting surroundings;
    a processor mounted in the cleaning robot;
    a memory in the cleaning robot;
    a localization module in the cleaning robot;
    non-transitory, computer-readable code in the memory having instructions for:
        (a) using the location sensor to create multiple floorplan maps of multiple environments;
        (b) storing the multiple floorplan maps in the memory;
        (c) detecting features of an environment around the cleaning robot;
        (d) matching, by the processor, the features to each of the multiple floorplan maps to determine a best match floorplan map to identify which environment the cleaning robot is in by
            first, localizing within each floorplan map by testing for a match for different locations within each floorplan map;
            second, identifying a best match within each floorplan map; and
            third, comparing the best match for each floorplan map to determine a best match floorplan map;
        (e) determining a confidence level for the best match floorplan map;
        (f) determining if the confidence level exceeds a confidence threshold; and
        (g) if the confidence level exceeds the confidence threshold, initiating cleaning of the environment using the best match floorplan map by providing controls to the motor.

11. The cleaning robot of claim 10 wherein the non-transitory, computer-readable code in the memory further comprises instructions for:
    if the confidence level does not exceed the confidence threshold, initiating a discovery mode to map the environment and add it as a new floorplan to the memory.

12. The cleaning robot of claim 10 wherein the non-transitory, computer-readable code in the memory further comprises instructions for:
    determining, with a movement sensor, that the cleaning robot has not been picked up; and
    using a last floorplan map if the cleaning robot has not been picked up.

13. The cleaning robot of claim 12 wherein
    the movement sensor is one of an accelerometer, gyroscopic sensor and a tilt sensor.

14. The cleaning robot of claim 13 wherein:
    the location sensor is one of an LDS sensor or an image sensor; and
    the instruction for the localizing uses a SLAM method with data from one of an LDS sensor or an image sensor.

15. The cleaning robot of claim 10 wherein the non-transitory, computer-readable code in the memory further comprises instructions for:

moving the cleaning robot;
after the cleaning robot moves to a new location during the cleaning, repeating steps (c)-(g) to verify that the cleaning robot has identified a correct floorplan map.

16. The cleaning robot of claim 15 wherein the non-transitory, computer-readable code instructions for repeating the instructions for (c)-(d) is performed if the robot is unable to determine a best match because a plurality of the multiple floorplan maps match within a threshold.

17. The cleaning robot of claim 10 wherein the non-transitory, computer-readable code in the memory further comprises instructions for:
   determining by the cleaning robot that the robot should be in another environment corresponding to a different floorplan map; and
   sending a notification to a user asking the user to move the cleaning robot to another environment.

18. The cleaning robot of claim 10 wherein the non-transitory, computer-readable code in the memory further comprises instructions for:
   assigning a name to each of the multiple floorplan maps; and
   sending a notification to a user identifying, with a name of a map, an environment where the cleaning robot is currently located.

19. A cleaning robot, comprising:
   a robot housing of the cleaning robot;
   a motor mounted in the housing for moving the cleaning robot;
   a battery connected to provide electrical power to the motor;
   a location sensor mounted in the cleaning robot for detecting surroundings, the location sensor being one of an LDS sensor or an image sensor;
   a processor mounted in the cleaning robot;
   a memory in the cleaning robot;
   a localization module in the cleaning robot;
   non-transitory, computer-readable code in the memory having instructions for:
      (a) using the location sensor to create multiple floorplan maps of multiple environments;
      (b) storing the multiple floorplan maps in the memory;
      (c) detecting features of an environment around the cleaning robot;
      (d) matching, by the processor, the features to each of the multiple floorplan maps to determine a best match floorplan map to identify which environment the cleaning robot is in, by
         first, localizing within each floorplan map by testing for a match for different locations within each floorplan map;
         second, identifying a best match with in each floorplan map; and
         third, comparing the best match for each floorplan map to determine a best match floorplan map;
      (e) determining a confidence level for the best match floorplan map;
      (f) determining if the confidence level exceeds a confidence threshold; and
      (g) if the confidence level exceeds the confidence threshold, initiating cleaning of the environment using the best match map by providing controls to the motor
      (h) if the confidence level does not exceed the confidence threshold, initiating a discovery mode to map the environment and add it as a new floorplan to the memory;
      (i) moving the cleaning robot;
      (j) after the cleaning robot moves to a new location during the cleaning, repeating steps (c)-(g) to verify that the cleaning robot has identified a correct floorplan map; and
      (k) determining, with a movement sensor, that the cleaning robot has not been picked up; and
      (l) using a last floorplan map if the cleaning robot has not been picked up.

20. The cleaning robot of claim 19 wherein the movement sensor is one of an accelerometer, gyroscopic sensor and a tilt sensor.

* * * * *